United States Patent
Garcia et al.

(10) Patent No.: US 10,894,377 B2
(45) Date of Patent: Jan. 19, 2021

(54) TIRE REGROOVING TOOL AND RELATED METHODS

(71) Applicants: Moises Garcia, Bakersfield, CA (US); Antonio Mercado, Bakersfield, CA (US)

(72) Inventors: Moises Garcia, Bakersfield, CA (US); Antonio Mercado, Bakersfield, CA (US)

( * ) Notice: Subject to any disclaimer, the term of this patent is extended or adjusted under 35 U.S.C. 154(b) by 0 days.

(21) Appl. No.: 16/233,094

(22) Filed: Dec. 27, 2018

(65) Prior Publication Data
US 2020/0207047 A1 Jul. 2, 2020

(51) Int. Cl.
*B29D 30/68* (2006.01)

(52) U.S. Cl.
CPC .................................. *B29D 30/68* (2013.01)

(58) Field of Classification Search
CPC ....................................................... B26D 30/18
See application file for complete search history.

(56) References Cited

U.S. PATENT DOCUMENTS

| | | | | |
|---|---|---|---|---|
| 1,926,520 | A * | 9/1933 | Fox | |
| 2,157,151 | A * | 5/1939 | Stackhouse | |
| 2,230,042 | A * | 1/1941 | Mertens, Jr. | |
| 2,240,382 | A * | 4/1941 | Van Alstine | |
| 2,254,974 | A | 9/1941 | Olson et al. | |
| 2,618,056 | A * | 11/1952 | Van Alstine | B29D 30/68 30/140 |
| 2,986,204 | A * | 5/1961 | Wilson | B29D 30/68 157/13 |
| 2,995,183 | A * | 8/1961 | Love | B29D 30/68 157/13 |
| 3,136,352 | A * | 6/1964 | Pettit | B29D 30/68 157/13 |
| 3,850,222 | A * | 11/1974 | Lejuene | B29D 30/68 157/13 |
| 4,817,697 | A * | 4/1989 | Takami | B26D 3/06 157/13 |
| 5,065,804 | A * | 11/1991 | Kinuhata | B23D 35/008 157/13 |
| 5,179,782 | A | 1/1993 | Van Alstine | |
| 5,247,983 | A | 9/1993 | Inez | |
| 6,230,603 | B1 | 5/2001 | Kubala | |
| 8,650,760 | B2 * | 2/2014 | Van Alstine | B26B 5/00 30/140 |
| D745,338 | S | 12/2015 | Bucks | |
| D748,291 | S | 1/2016 | Kamil | |
| D795,468 | S | 8/2017 | Kamil | |
| D795,469 | S | 8/2017 | Kamil | |
| D831,235 | S | 10/2018 | Clayton | |
| 2013/0276604 | A1 | 10/2013 | King | |
| 2019/0329510 | A1 * | 10/2019 | Bessac | B29D 30/06 |

FOREIGN PATENT DOCUMENTS

EP 0505178 9/1992

\* cited by examiner

*Primary Examiner* — Omar Flores Sanchez
(74) *Attorney, Agent, or Firm* — William K. Nelson; Sierra IP Law, PC

(57) ABSTRACT

This device, designed for cutting the grooves of pneumatic tire treads, includes a re-grooving tool having two distal cutting points that creates grooves in the tire treads having two subgrooves. The grooves improve the fuel efficiency of vehicle and the subgrooves improve channeling and clearance of rain, snow, mud, and other hazardous materials on the road.

13 Claims, 3 Drawing Sheets

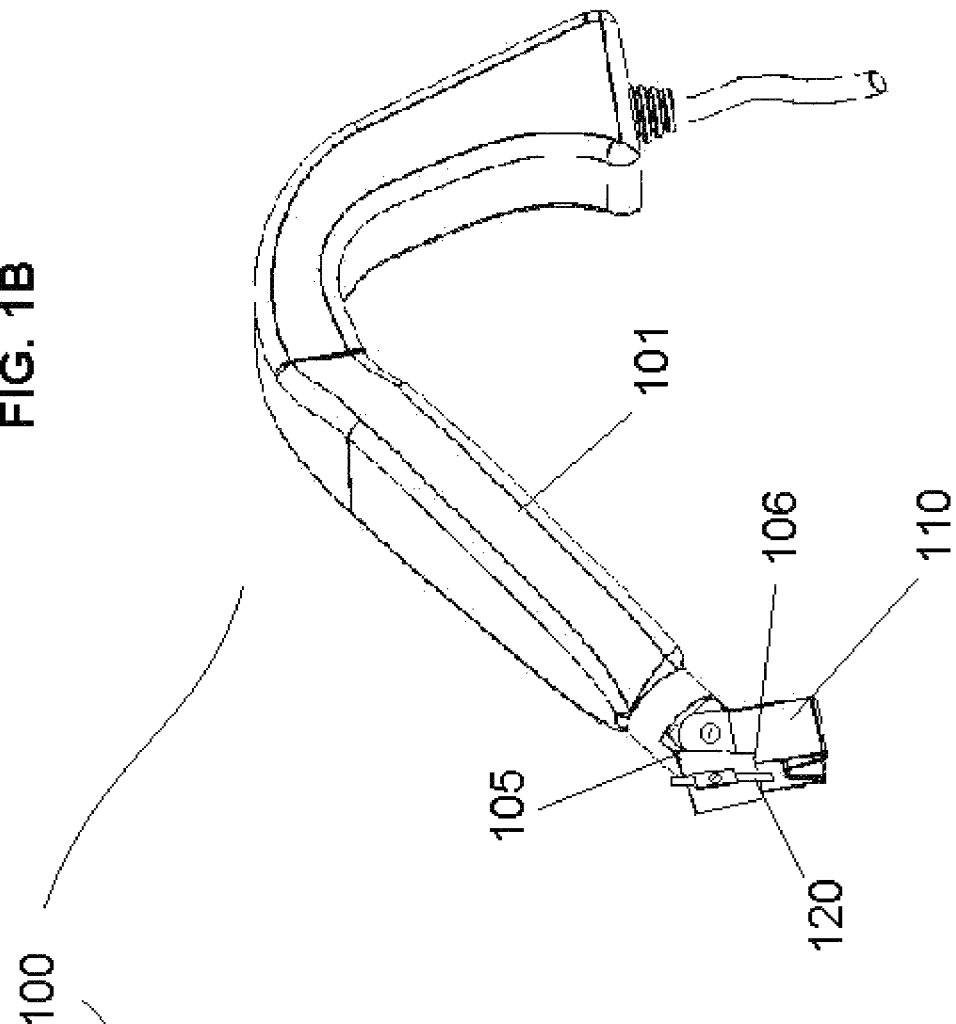
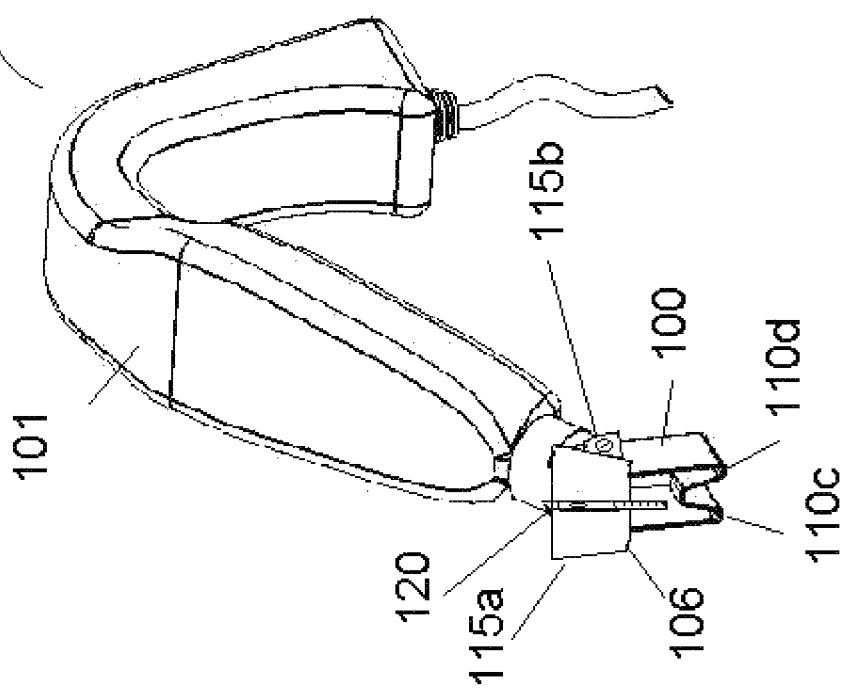

TIRE REGROOVING TOOL AND RELATED METHODS

FIELD OF THE INVENTION

The present invention relates to improved tools for forming grooves in tires and related methods. More specifically, the present invention relates to tools for cutting or carving grooves in tire treads, including a bit in a regrooving tool having a novel shape. The bit may be pressed against the bottom of the existing groove to deepen and regroove the same, or to create new grooves in the tire.

DISCUSSION OF THE BACKGROUND

Commercial vehicle tires such as those used in trucks and buses are designed with a subtread having a substantial thickness of rubber between the bottom of the grooves and the outermost ply of the reinforcement layer over the carcass. Consequently, the tire can be regrooved by deepening the worn grooves. A regrooving device can be used to follow the line of the worn groove on the surface of the tread. Regrooving may be used to optimize the mileage of tires and extend a tire's grip. As long as the undertread of the tire is thick enough to allow regrooving, without affecting the strength or toughness of the product. If properly carried out properly, regrooving may not adversely affect the strength of the crown block and casing of a tire.

A regrooved tire may provide improved safety, and lower fuel consumption. Regrooving provides cleaner edges and increased tread depth. As a worn tire has less compound deformation in the tread pattern, it gets less hot and so offers less rolling resistance and uses less fuel. For example, the fuel saved for a tractor and trailer by regrooving tires can be in the range of 1 gallon of fuel per 200 miles.

Regrooving is thus a valuable method of extending the life of tires and improving the performance thereof.

SUMMARY OF THE INVENTION

The present invention provides a novel regrooving blade for regrooving tires. The invention is operable to regroove tires to extend their usable life and improve the gas mileage of vehicles beyond prior regrooving tools. The regrooving blades of the present application provide two or more adjacent grooves, which may increase the surface area exposed within a groove area, thereby providing better safety in hazardous driving conditions, preventing spinouts or hydroplaning. Additionally, tires regrooved with the presently disclosed regrooving blade may reduce the risk that a vehicle will get stuck in muddy or snowy condition, or slide down an icy or snowy incline. The regrooving device of the present invention also provides for increased surface-to-air contact on the tire to lower tire surface temperature.

The tire regroovng tool of the present invention may be used to deepen or reform the grooves in a worn tire, and also for cutting grooves in the face of a retreaded tire. The regrooving tool may have a two-point regrooving blade that may form a double groove in the outer surface of a tire, which provides a groove better to deal with rain, snow, or other fluid hazards on the road that reduce traction of the tire surface.

In some embodiments, the regrooving blade may be positioned against the bottom of the tread pattern of the tire, rather than the tire surface and then passed along the groove to recreate grooves in the tire. The device designed for cutting the grooves of tire treads, is composed of a knife whose shape creates two subgrooves to create two channels for passing liquids and other flowable materials on the road along the grooves.

In one aspect, the present invention relates to a tire regrooving device for cutting grooves in the tread of a tire, comprising a main body having a gripping handle at its near end and a cutting tool assembly at its distal end, the assembly comprising a cutting blade, the cutting blade having two distal cutting points and being operable to cut grooves having two subgrooves in the surface of the tire, and a blade holder to which the cutting blade is attached. The regrooving device may include a guide element operable to set a predetermined cutting depth for the cutting blade. The cutting blade may have two lateral branches, each ending at one of the two distal cutting points. The cutting blade may include two medial branches that extend obliquely back toward the main body and attach at a central apex point. The two distal cutting points and the central apex point may create a protrusion within the grooves having a substantially triangular cross-section. The two subgrooves may have substantially triangular cross-sections. The cutting blade may be attached to the holder by the insertion of the upper portions of the lateral branches into the blade holder. The upper portions of the cutting blade branches may be inserted into channels of the blade holder and are secured therein by a fastening device. The regrooving device may include a cutting blade heating mechanism. The regrooving device may have a hand-grip attached to the distal region of its main body.

In a second aspect, the present invention relates to a cutting blade for a tire regrooving device, comprising two distal cutting points and being operable to cut grooves having two subgrooves in the surface of a tire; two lateral branches, each ending at one of the two distal cutting points; and two medial branches that extend obliquely back toward the main body and attach at a central apex point. The two distal cutting points and the central apex point may create a protrusion within the grooves having a substantially triangular cross-section. The two subgrooves may have substantially triangular cross-sections.

In a third aspect, the present invention relates to a method for cutting partially worn grooves to a new depth in the tread of a partially worn out tire, the method comprising inserting a cutter blade into a worn groove, the cutter blade having two distal cutting points; and pushing the cutter blade in a circumferential direction following the groove pattern along the tire surface, carving out the tread material enclosed by the cutting blade and the guide element to create a groove having two subgrooves in the tire surface. The cutting blade may include two lateral branches, each ending at one of the two distal cutting points. The cutting blade may include two medial branches that extend obliquely back toward the main body and attach at a central apex point. The two distal cutting points and the central apex point may create a protrusion within the grooves having a substantially triangular cross-section. The two subgrooves may have substantially triangular cross-sections. The regrooving device may include a guide element to set a predetermined cutting depth for the cutting blade.

Further objects and aspects of the present invention will be apparent from the description provided herein.

BRIEF DESCRIPTION OF THE DRAWINGS

FIG. 1A shows a perspective view of a regrooving tool according to an embodiment of the present invention.

FIG. 1B shows a perspective view of a regrooving tool according to an embodiment of the present invention.

DETAILED DESCRIPTION OF THE DRAWINGS

Figure 2B:
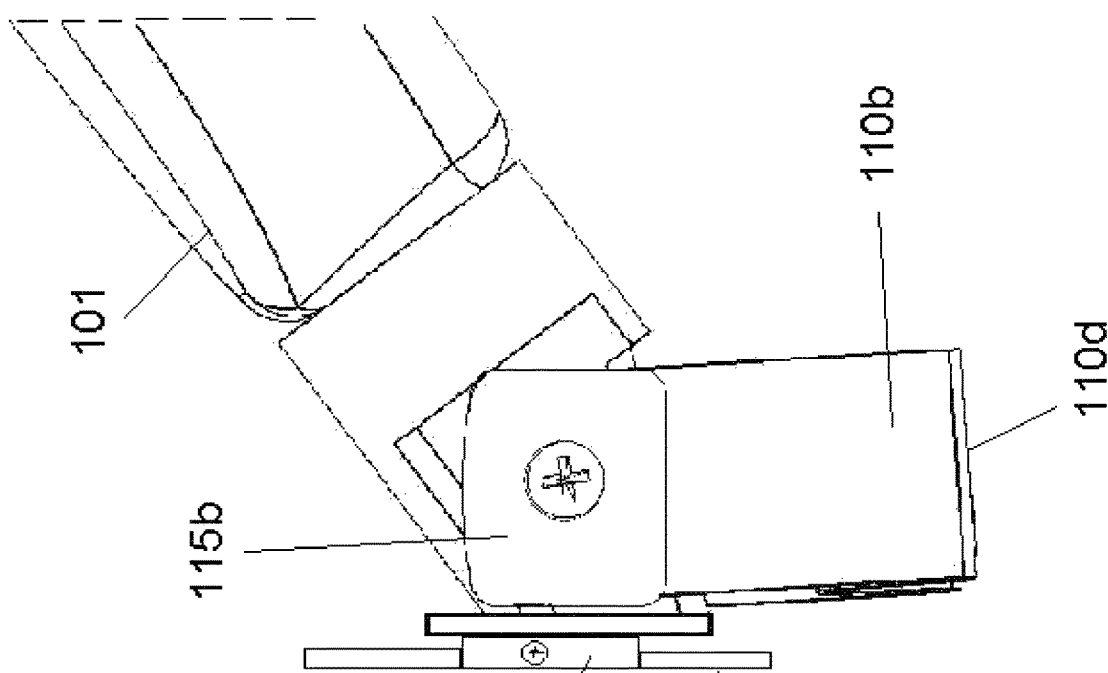
FIG. 2B shows a side elevation view of a regrooving tool according to an embodiment of the present invention.
Figure 2A:
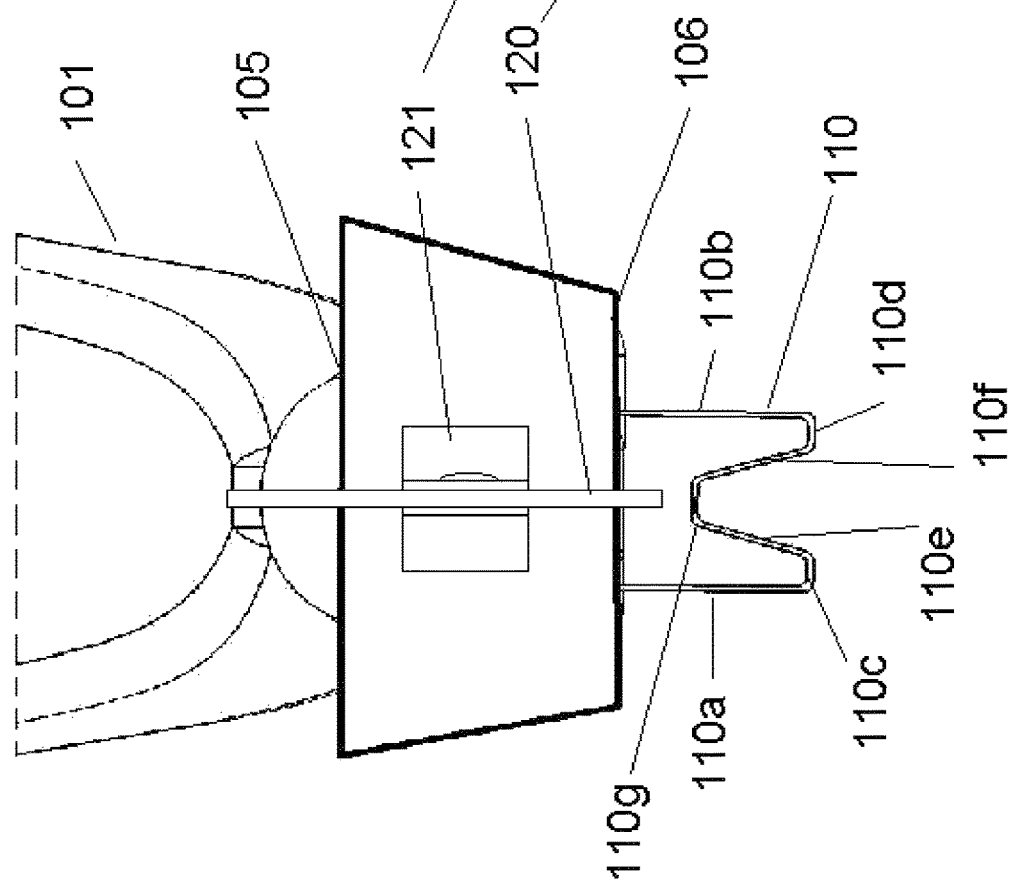
FIG. 2A shows a front elevation view of a regrooving tool according to an embodiment of the present invention.

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

As seen in FIGS. 1A-3B, the present invention provides a novel regrooving blade and regrooving tool for reapplying grooves to the tread of tires for purposes of refurbishment. The regrooving tool 100 may include a stock 101 in which a blade holder carriage 102 is mounted at a distal end thereof. The regrooving tool 100 may be an electrical device that is powered through electrical cord 103. The electrical cord 103 may be connected to a heating element that is used to heat a blade 110 of the regrooving tool 100. In some embodiments, the re-grooving tool may be a manual tool, where the tire material is cut applied force of the user.

The carriage 102 may include a blade holder 105, which may have a contact surface 106 for positioning on the tread of a tire during a regrooving operation. The blade holder carriage 102 may have blade engagement channels 115a and 115b into which lateral branches of the blade 110 may be secured. The lateral braches 110a and 110b may be inserted into the channels 115a and 115b by sliding or slotting the lateral branches 110a and 110b into the channels 115a and 115b, respectively, or by another insertion method. The fixing mechanism 116 may then be used to reversibly fix the blade 110 in place. The blade holder 102 is operable to secure the lateral branches 110a and 110b with the blade 110 at protruding at various distances from the blade holder carriage 102, allowing the depth of the grooves to be formed in a tire to be adjusted to a desired depth. This depth may be determined based on the thickness of the tread remaining on the tire, and the particular type of tire (e.g., tires for tractor-trailer tires, construction equipment, farming equipment, or domestic vehicle tires).

The regrooving blade 110 of the present application provide two or more adjacent grooves, which may increase the surface area exposed within a groove area, thereby providing better safety in hazardous driving conditions. The cutting blade 110 may have two distal cutting points 110c and 110d. The dual distal points 110c and 110d being operable to cut grooves having two subgrooves in the surface of the tire. The two lateral branches 110a and 110b may each end at one of the two distal cutting points, 110c and 110d, respectively. The cutting blade 110 may include two medial branches 110e and 110f that extend back toward the main body (e.g., at an oblique angle) and attach at a central apex point 110g. The two distal cutting points 110c and 110d and the central apex point 110g may create a protrusion within the grooves having a substantially triangular cross-section. The two subgrooves may also have substantially triangular cross-sections In some embodiments, the re-grooving tool may include an adjustable depth guide 120 that may protrude from the blade holder 105. The adjustable depth guide 120 may be positioned such that its distal end contacts the bottom of an existing grove. The adjustable depth guide 120 may be held in position by a releasable fastener (e.g., a clam screw) that allows the adjustable depth guide 120 to be adjusted and then re-fixed in the desired position. Prior to re-grooving, the position of the depth guide 120 may be adjusted to reach the bottom of the existing groove when the contact surface 106 is resting on the outer surface of the tread. Subsequently, the position of the blade may be adjusted such that it protrudes past the distal end of the adjustable depth guide 120 to pre-determined depth (i.e., the desired depth of the new grooves). The distance by which the blade protrudes beyond the depth guide corresponds to the depth to which the new groove will be cut. The recommended distance for a particular tire may be derived from the tire manufacturer's re-grooving literature regarding the depth to which the tread may be cut safely. The blade 110 may be adjusted to the appropriate position relative to the adjustable guide by precise measurement of the depth to which the blade 110 protrudes past the depth guide. In some embodiment, and without limitation, the depth guide and/or the blade may have graduations thereon, providing a means of measuring the amount the blade protrudes past the depth guide.

The present invention also includes a method for cutting new grooves or partially worn grooves to a new depth in the tread of a tire. The method may first include the process of setting the blade 110 position in the channels 115a and 115b of the blade holder 105 based on the desired depth of the grooves to be cut. The lateral branches 110a and 110b may be inserted into the channels 115a and 115b to the preferred position. In some embodiments, the adjustable depth guide 120 may be adjusted to position the depth guide 120 such that its distal end rests on the bottom of an existing groove when contact surface 106 is resting on the outer surface of the tread of the tire. The position of the blade 110 may then be positioned relative to the depth guide 120 to enable the cutting of a groove having a pre-determined depth.

Figure 3B:
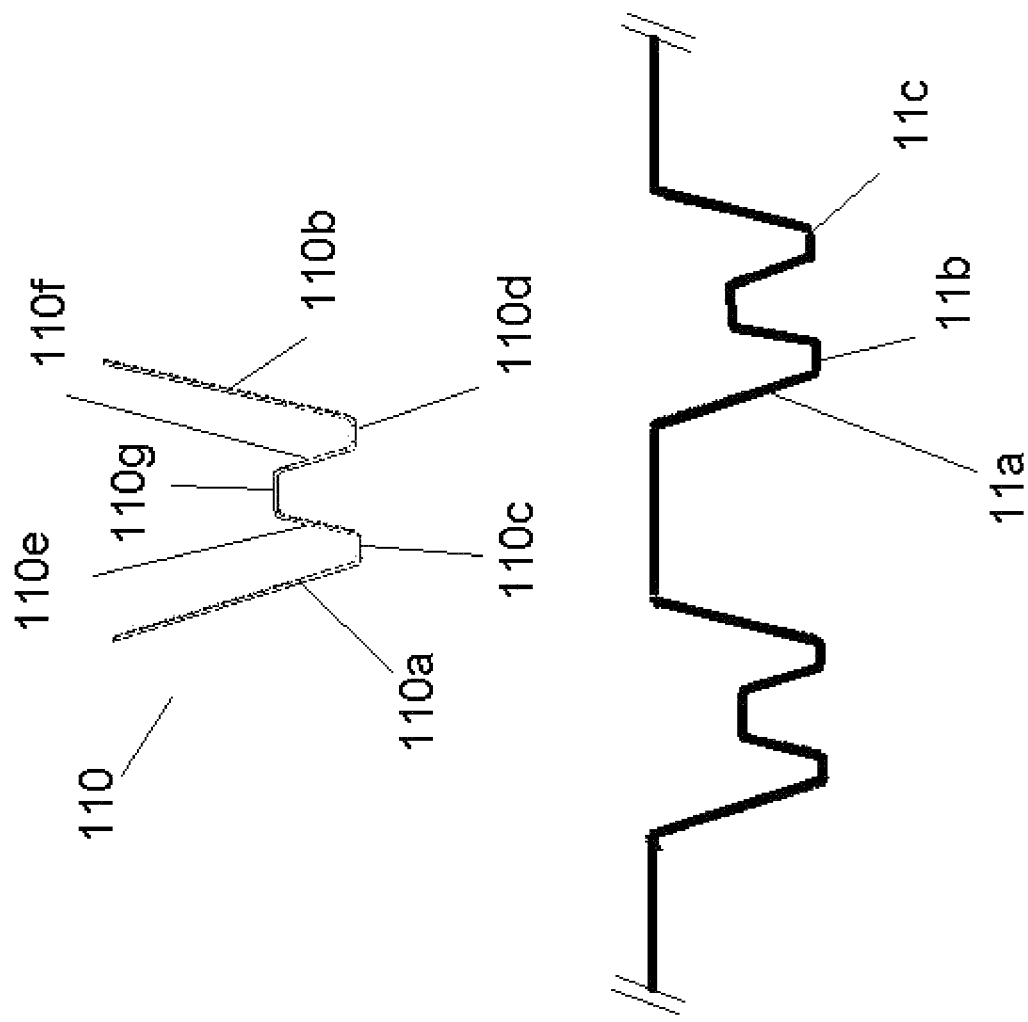
FIG. 3B shows a view of a regrooving tool blade and grooves created by the regrooving tool blade according to an embodiment of the present invention.
Figure 3A:
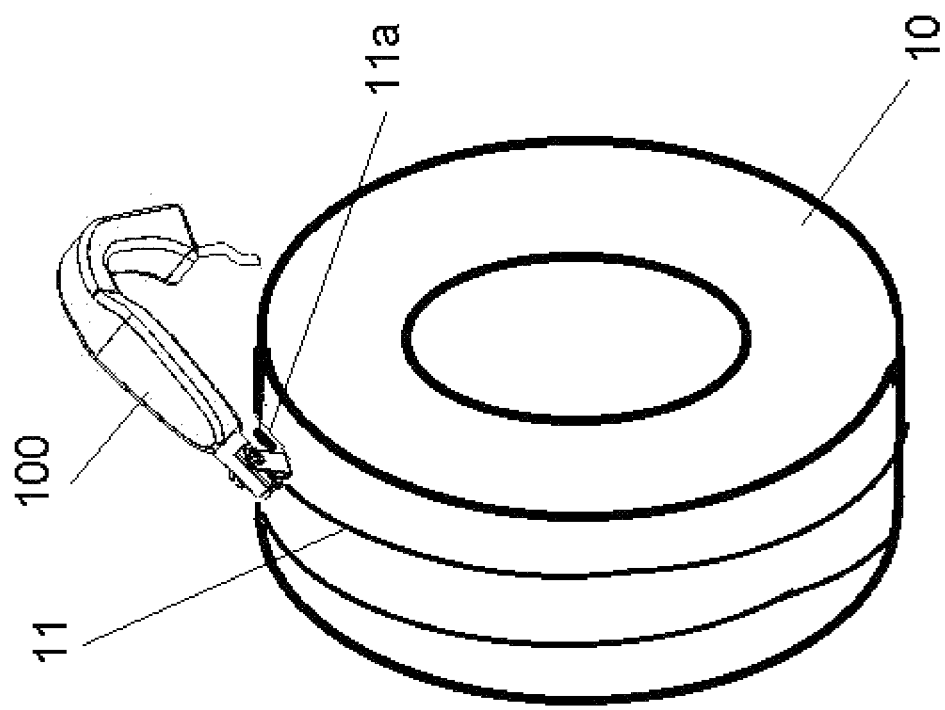
FIG. 3A shows a regrooving tool being used to regroove a tire according to an embodiment of the present invention.

As shown in FIG. 3A, once the blade position 110 is set, the blade 110 may be inserted into a worn groove or a retreated tire 10, and the blade 110 may be passed along the tread in a circumferential direction (e.g., following the groove pattern), such that the two distal cutting points 110c and 110d carve out the tread material enclosed by the blade 110 and create a groove 11a having two subgrooves 11b and 11c in the tire surface. The two distal cutting points 110c and 110d and the central apex point 110g may create a protrusion within the grooves having a substantially triangular or trapezoidal cross-section. The two subgrooves 11b and 11c may have substantially triangular or trapezoidal cross-sections.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed:

1. A tire regrooving device for cutting grooves in the tread of a tire, comprising:
   a. a main body having a gripping handle at its near end and a cutting tool assembly at its distal end, said assembly comprising
      i. a cutting blade, said cutting blade having
         1. two distal cutting points and being operable to cut grooves having two subgrooves in the surface of said tire,
         2. two lateral branches, each ending at one of said two distal cutting points, and
         3. two medial branches that extend obliquely back toward the main body and attach at a central apex point and
      ii. a blade holder to which said cutting blade is attached.
2. The device of claim 1, further comprising a guide element operable to set a predetermined cutting depth for said cutting blade.
3. The device of claim 1, wherein said two distal cutting points and said central apex point create a protrusion within said grooves having a substantially triangular cross-section.
4. The device of claim 3, wherein said two subgrooves have substantially triangular cross-sections.
5. The device of claim 1, wherein said cutting blade is attached to said holder by the insertion of the upper portions of said lateral branches into said blade holder.
6. The device of claim 2, wherein said upper portions of said cutting blade branches are inserted into channels of the blade holder and are secured therein by a fastening device.
7. The device of claim 1, wherein said device comprises cutting blade heating mechanism.
8. The device of claim 1, wherein said device comprises a hand-grip attached to the distal region of its main body.
9. A method for cutting grooves in the tread of a tire, the method comprising:
   a. inserting a cutter blade into the tread of a tire, the cutter blade being mounted in cutting tool assembly said cutter blade having
      i. two distal cutting points,
      ii. two lateral branches, each ending at one of said two distal cutting points and
      iii. two medial branches that extend obliquely back toward the cutting tool assembly and attach at a central apex point; and
   b. passing the cutter blade in a circumferential direction along the tire surface, carving out the tread material enclosed by the cutting blade and the guide element to create a groove having two subgrooves in the tire surface.
10. The method of claim 9, wherein said two distal cutting points and said central apex point create a protrusion within said grooves having a substantially triangular cross-section.
11. The method of claim 10, wherein said two subgrooves have substantially triangular cross-sections.
12. The method of claim 9, further comprising a guide element to set a predetermined cutting depth for said cutting blade.
13. The method of claim 9, wherein the tire has partially worn grooves, the cutting blade is inserted into a partially worn groove, and the cutting blade follows the groove pattern to cut the partially worn groove to a new depth.

* * * * *